United States Patent
Hill et al.

(10) Patent No.: US 6,751,413 B2
(45) Date of Patent: Jun. 15, 2004

(54) CHANNEL MASK DEFINITION FOR MONITORING WAVELENGTH DIVISION MULTIPLEXING TRANSMISSION SYSTEMS

(75) Inventors: Gregory Steven Hill, Santa Rosa, CA (US); Joerg Hilger, Santa Rosa, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 549 days.

(21) Appl. No.: 09/777,780

(22) Filed: Feb. 5, 2001

(65) Prior Publication Data
US 2002/0135834 A1 Sep. 26, 2002

(51) Int. Cl.[7] ............................................. H04B 10/08
(52) U.S. Cl. ......................... 398/14; 398/38; 398/25; 398/26; 398/34
(58) Field of Search .......................... 398/14, 38, 25, 398/26, 34; 356/320; 370/252; 375/227; 702/81

(56) References Cited
U.S. PATENT DOCUMENTS 5,920,414 A * 7/1999 Miyachi et al. ............... 398/14
5,969,834 A * 10/1999 Farber et al. ................. 398/34
5,986,782 A * 11/1999 Alexander et al. ........... 398/26
6,064,501 A * 5/2000 Roberts et al. ............... 398/11
6,215,572 B1 * 4/2001 Taneda ......................... 398/95
6,295,147 B1 * 9/2001 Yamane et al. ................ 398/9
6,344,910 B1 * 2/2002 Cao ............................. 398/34
6,385,552 B1 * 5/2002 Snyder ....................... 702/123
6,571,285 B1 * 5/2003 Groath et al. ............... 709/223

OTHER PUBLICATIONS

"User's Guide Agilent 8612A WDM Channel Analyzer", available from Agilent Technologies as Publication No. 86121–90001, Jan. 2000, pp. 2–5, 2–6, 3–28, 3–29.

* cited by examiner

Primary Examiner—Leslie Pascal
Assistant Examiner—David C. Payne

(57) ABSTRACT

Multiple signals are monitored, for example, by an instrument used for monitoring wavelength division multiplexing (WDM) transmission systems. For each monitored frequency channel, an active mask is initialized. The active mask includes an operating window defined by a minimum frequency, a maximum frequency, a minimum amplitude and a maximum amplitude. Each signal is monitored to determine when the signal strays outside the operating window. An alarm is generated when the signal strays outside the operating window.

20 Claims, 6 Drawing Sheets

CHANNEL MASK DEFINITION FOR MONITORING WAVELENGTH DIVISION MULTIPLEXING TRANSMISSION SYSTEMS

BACKGROUND

The present invention concerns signal analysis and pertains particularly to defining a channel mask for the purpose of monitoring wavelength division multiplexing (WDM) transmission systems.

Wavelength division multiplexing (WDM) fiber optic transmission systems use between 4 and 500 laser signals to transmit information. Each laser signal resides within a specific frequency channel. The channel is defined by its center frequency and signal power. It is desirable to monitor the performance of each laser signal within the many channels of a WDM system.

In prior art multi-wavelength meter (MWM) systems the performance of the laser signals within the channels is listed in a tabular (textual) format. The task of monitoring the channels is left to the user and his ability to analyze the data using an external computer to assess the performance of the individual laser signals relative to the channel center frequency, minimum and maximum power and frequency constraints. This method is complicated because it requires the user to develop additional software and to use additional hardware to make the measurement.

SUMMARY OF THE INVENTION

In accordance with the preferred embodiment of the present invention, multiple signals are monitored, for example, by an instrument used for monitoring wavelength division multiplexing (WDM) transmission systems. For each monitored frequency channel, an active mask is initialized. The active mask includes an operating window defined by a minimum frequency, a maximum frequency, a minimum amplitude and a maximum amplitude. Each signal is monitored to determine when the signal strays outside the operating window. An alarm is generated when the signal strays outside the operating window or outside the active mask boundaries.

In the preferred embodiment, the active mask for each monitored frequency channel additionally includes a center frequency, a minimum channel frequency limit, a maximum channel frequency limit and a power threshold limit.

In the preferred embodiment, when an alarm is generated an alarm entry is made. Each alarm entry indicates channel information such as average frequency, minimum frequency, maximum frequency, minimum power, maximum power, current power, current frequency. Each alarm entry also indicates time of alarm generation, date of the alarm generation and an error code indicating a region of operation at the time of the alarm generation.

A user has flexibility in selecting mask parameters. For example, the minimum frequency, the maximum frequency, the minimum amplitude and the maximum amplitude can vary between all active masks. Alternatively, active masks within specified frequency bands can have identical channel spacing with varying minimum amplitudes. Alternatively, active masks within specified frequency bands can have identical channel spacing with identical minimum/maximum amplitudes and frequencies.

The present invention simplifies the process of monitoring multiple laser signals by user created masks or automatically created masks. The instrument used the mask to verify that each laser signal is within the prescribed frequency and power range. The invention also accounts for the fact that in WDM systems the noise power floor is wavelength dependent, i.e., accounts for the fact that each laser is set to a unique power level resulting in a uniform optical-signal-to-noise ratio for all laser lines/channels.

DESCRIPTION OF THE PREFERRED EMBODIMENT

Figure 1:
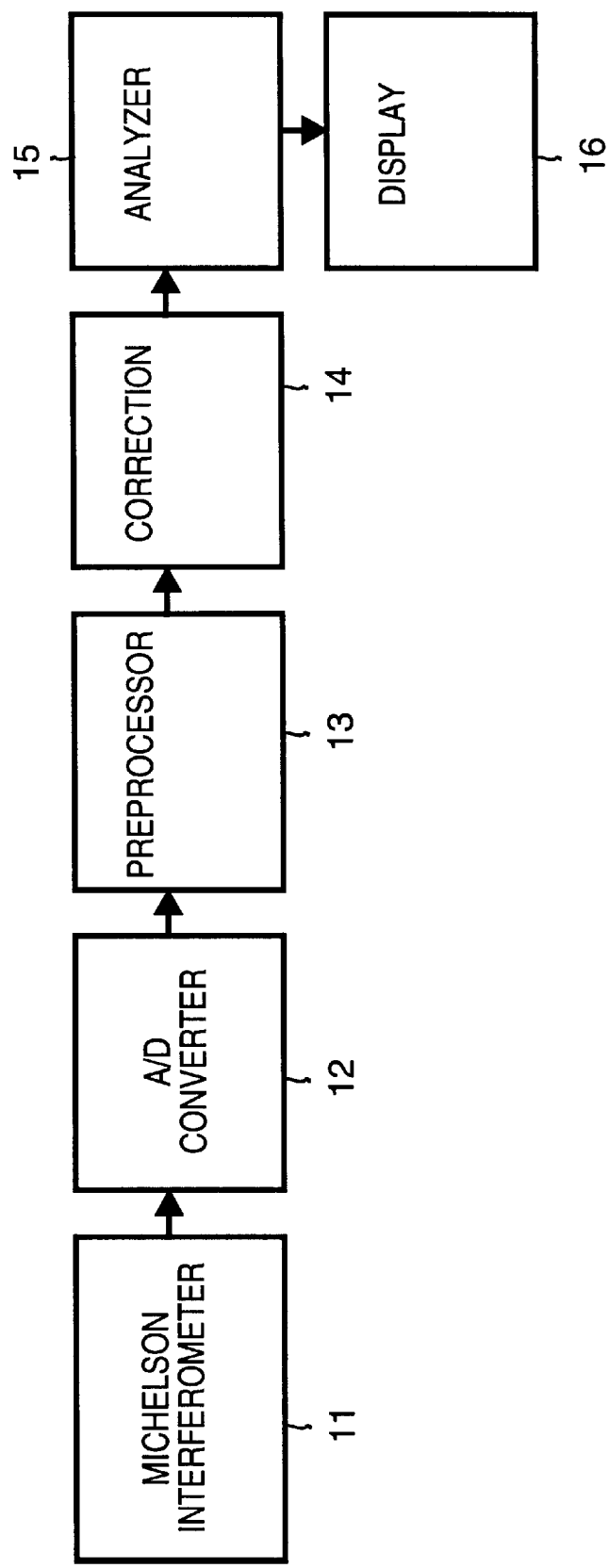
FIG. 1 is a simplified block diagram that illustrates operation of a channel analyzer.

FIG. 1 is a simplified block diagram that illustrates operation of a channel analyzer. A Michelson interferometer 11 includes a receive diode which generates analog signals forwarded to an analog-to-digital (A/D) converter 12. A preprocessor 13 receives the analog data into a buffer. For example, the buffer is a memory that contains 256 K words of data. The data is in the time domain. Preprocessor uses a Fast Fourier Transform (FFT) to generate data in the frequency domain. For example, a memory is used to store 128 K double words of frequency domain data. Each double word contains a value in complex (r+ji) format. After performing a filter function and a magnitude calculation to generate the 128 double/real elements. The resulting data is passed to a correction block 14.

Correction block 14 uses a correction table to correct nonlinearity in the receiving diode and to adjust diode gain as necessary to a lower gain in order to generate 128 K corrected double/real elements. From these elements are derived an input array to analyzer block 15. From the input array, analyzer block 15 finds data for each channel, and stores the data for the channels in a channel repository. The channels are shown by a display 16, as part of a graphical user interface (GUI). Analyzer block 14 also generates masks for each channel, as further described below.

The preferred embodiment of the present invention simplifies the process of monitoring multiple laser signals by specifying a mask for each of the channels or group of channels. The channel analyzer uses the mask to verify that each laser signal is within the prescribed frequency and powers. The user can set (or the instrument can set automatically) different bandwidths and powers for different channels or groups of channels. This allows the user (or instrument) to vary the definition of the mask to take into account that in WDM systems the noise power floor is wavelength dependent. This accounts for the fact that to achieve a specific optical-signal-to-noise ratio the power of each laser is set to a unique level.

For each channel, the mask defined by the user supplied frequency and amplitude values is used by the channel analyzer to verify that each laser signal is within the frequency and amplitude specified by the user. The channel analyzer monitors each laser signal and compares it to the appropriate channel masks and detects and records when the laser signal moves outside of the desired operation window.

Figure 2:
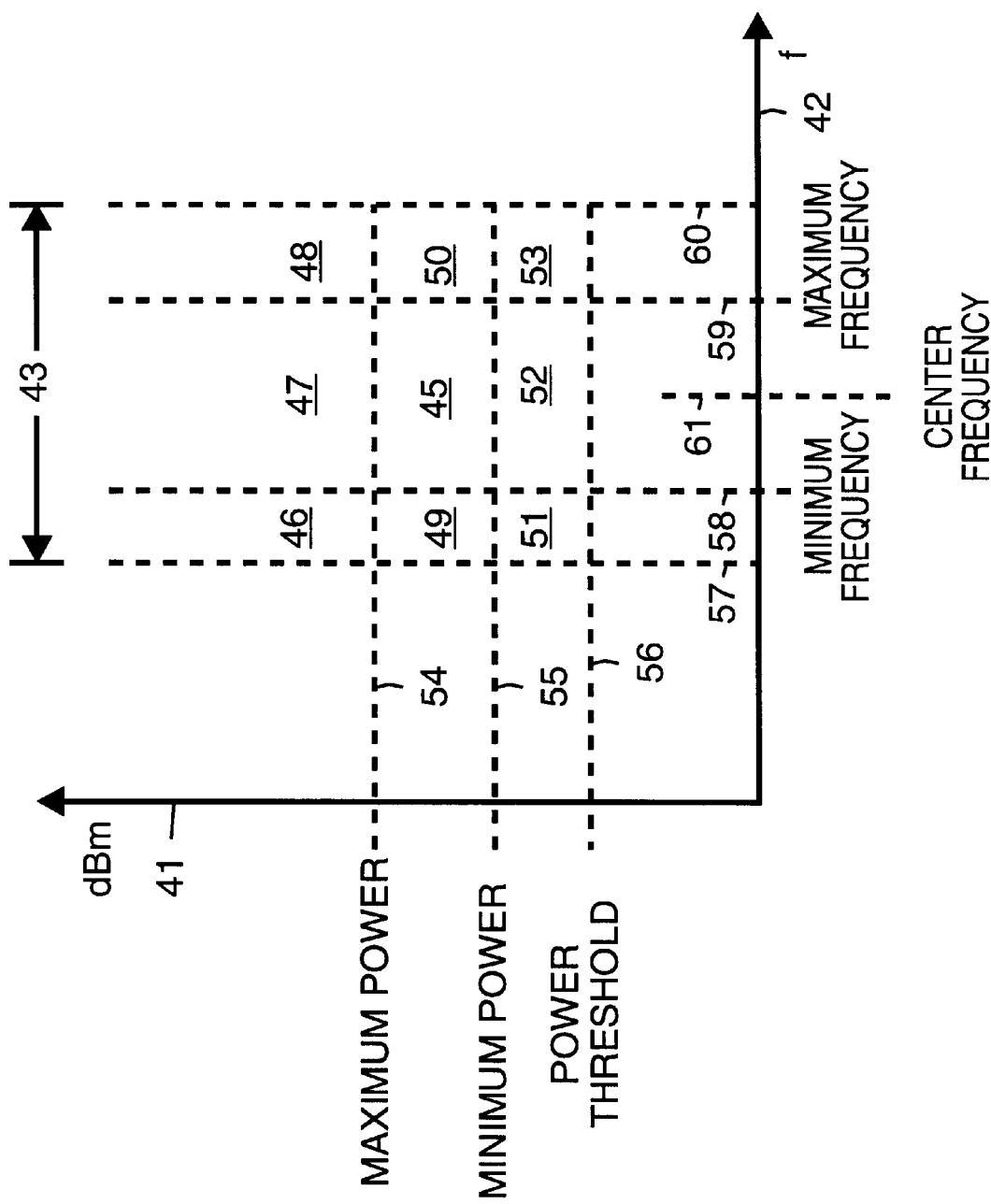
FIG. 2 shows a channel mask used to monitor wavelength division multiplexing (WDM) transmission systems in accordance with a preferred embodiment of the present invention.

FIG. 2 illustrates a mask being used to monitor the operation of one of the many laser signals in a WDM system. The user can choose to create one mask that will be applied to all channels, or create several masks that are applied to regions of the wavelength range of interest. The mask consists of a center frequency (wavelength) 61, a minimum operating frequency 58, a maximum operating frequency 59, a minimum power 55 and a maximum power 54. A user specifies the desired operating window by specifying the above frequency and power values. The mask also includes a frequency range 43 that is the frequency range of the channel which extends between a minimum channel frequency limit 57 and a maximum channel frequency limit 60. A power threshold limit 56 indicates a power threshold necessary to detect a signal.

Within the mask, several operating regions are defined. A region 45 is the operating window of the mask. A region 47 is a region where the laser signal has an amplitude above maximum power 54. A region 52 is a region where the laser signal has an amplitude below minimum power 55. A region 49 is a region where the laser signal has a frequency below minimum operating frequency 58. A region 50 is a region where the laser signal has a frequency above maximum operating frequency 59. A region 46 is a region where the laser signal has an amplitude above maximum power 54 and has a frequency below minimum operating frequency 58. A region 48 is a region where the laser signal has an amplitude above maximum power 54 and has a frequency above maximum operating frequency 59. A region 51 is a region where the laser signal has an amplitude below minimum power 55 and has a frequency below minimum operating frequency 58. A region 53 is a region where the laser signal has an amplitude below minimum power 55 and has a frequency above maximum operating frequency 59.

In FIG. 2 (as well as FIGS. 3, 4 and 5) a frequency axis 42 indicates the frequency, and a decibel (dBm) axis 41 indicates signal amplitude at a specified frequency.

The channel analyzer monitors the laser signal relative to the mask and updates the channel information. This includes updating the following parameters: average power, average frequency, maximum frequency, minimum frequency, minimum power and maximum power. Alarms will be generated if active mask violations occur.

Table 1 is an example of which information is updated by the channel analyzer for a channel.

TABLE 1

| Region | Ave Power | Ave Freq | Min Freq | Max Freq | Min Power | Max Power | Alarm |
|--------|-----------|----------|----------|----------|-----------|-----------|-------|
| 45     | yes       | yes      | yes      | yes      | yes       | yes       | no    |
| 49/50  | yes       | no       | no       | no       | yes       | yes       | yes   |
| 47/52  | no        | yes      | yes      | yes      | no        | no        | yes   |

TABLE 1-continued

| Region | Ave Power | Ave Freq | Min Freq | Max Freq | Min Power | Max Power | Alarm |
|--------|-----------|----------|----------|----------|-----------|-----------|-------|
| 46/48  | no        | no       | no       | no       | no        | no        | yes   |
| 51/53  | no        | no       | no       | no       | no        | no        | yes   |
| other  | no        | no       | no       | no       | no        | no        | yes   |

The 'region' column refers to a region within the user-defined mask shown in FIG. 2. For example "49/50" indicates the row of values applies to region 49 and region 50. The following values are listed average power, average frequency, minimum frequency, maximum frequency, minimum power, maximum power. The 'yes' and 'no' symbols in columns headed by a value indicate which values will be updated when the laser signal is within specified regions. A 'yes' indicates that for a specified region the specified value will be updated. A 'no' indicates that for a specified region the specified value will not be updated. A 'yes' in the Alarm column indicates a signal in the specified region will result in an alarm being generated when violation occurs the first time. A 'no' in the Alarm column indicates a signal in the specified region will not result in an alarm being generated.

When the laser signal violates the mask by moving outside of the desired operating window, the channel analyzer records the following channel information for future retrieval: average power, average frequency, minimum frequency, maximum frequency, minimum power, maximum power, current power, current frequency. Additionally the channel analyzer records the time/date of violation, and an error code that indicates the region of operation at the time of the alarm.

In a preferred embodiment of the present invention, it is possible to account for the fact that the noise floor in a WDM system is wavelength dependent. The noise floor in a WDM system is wavelength dependent when the power of each laser signal is individually set in order to maintain a constant optical-signal-to-noise ratio (OSNR). To take into account the varying noise floor, the mask power level parameter for different masks is wavelength dependent.

Figure 3:
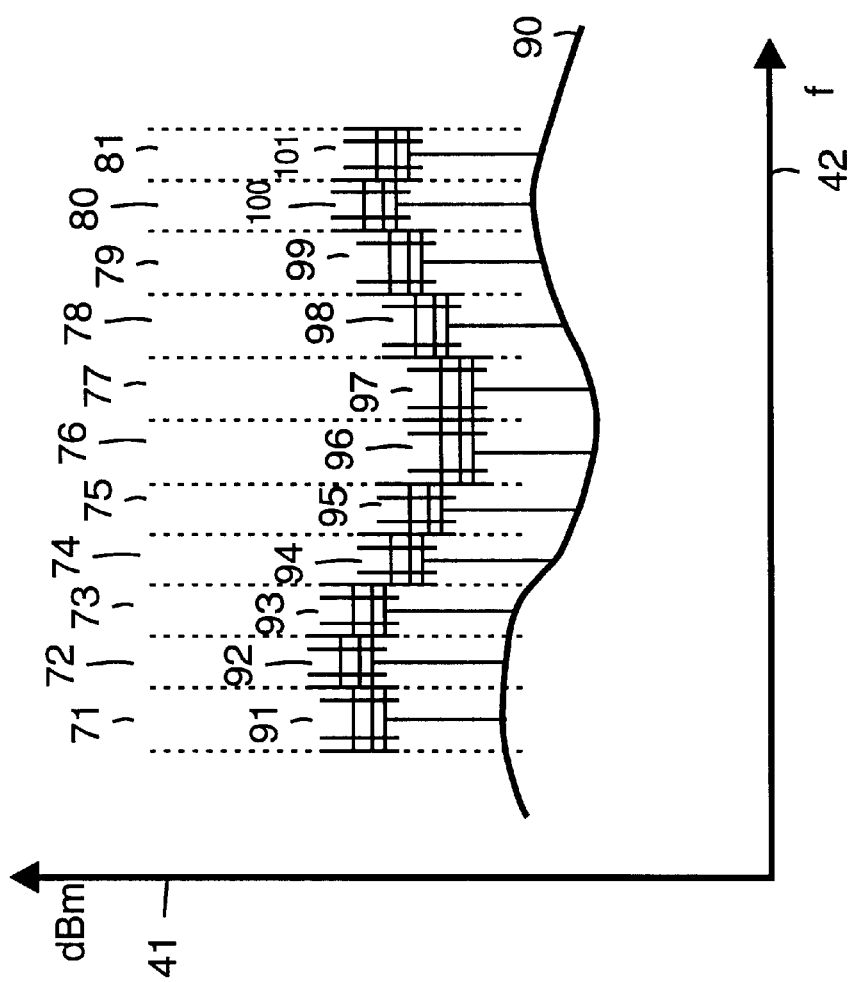
FIG. 3 shows active channel masks designed to account for variation in laser signal power resulting from a varying noise floor in accordance with a preferred embodiment of the present invention.

For example, FIG. 3 illustrates that the amplitude limit can be individually adjusted for each mask. A wave form 90 represents a noise floor in a WDM system. An active mask 91 is shown within a channel 71. An active mask 92 is shown within a channel 72. An active mask 93 is shown within a channel 73. An active mask 94 is shown within a channel 74. An active mask 95 is shown within a channel 75. An active mask 96 is shown within a channel 76. An active mask 97 is shown within a channel 77. An active mask 98 is shown within a channel 78. An active mask 99 is shown within a channel 79. An active mask 100 is shown within a channel 80. An active mask 101 is shown within a channel 81. Active masks 91 through 101 are designed to account for the variation in laser signal power which is driven by the varying noise floor and the need to maintain a constant OSNR. FIG. 3 also illustrates that the frequency limits of masks can be varied to take into account varying signal bandwidths.

Figure 4:
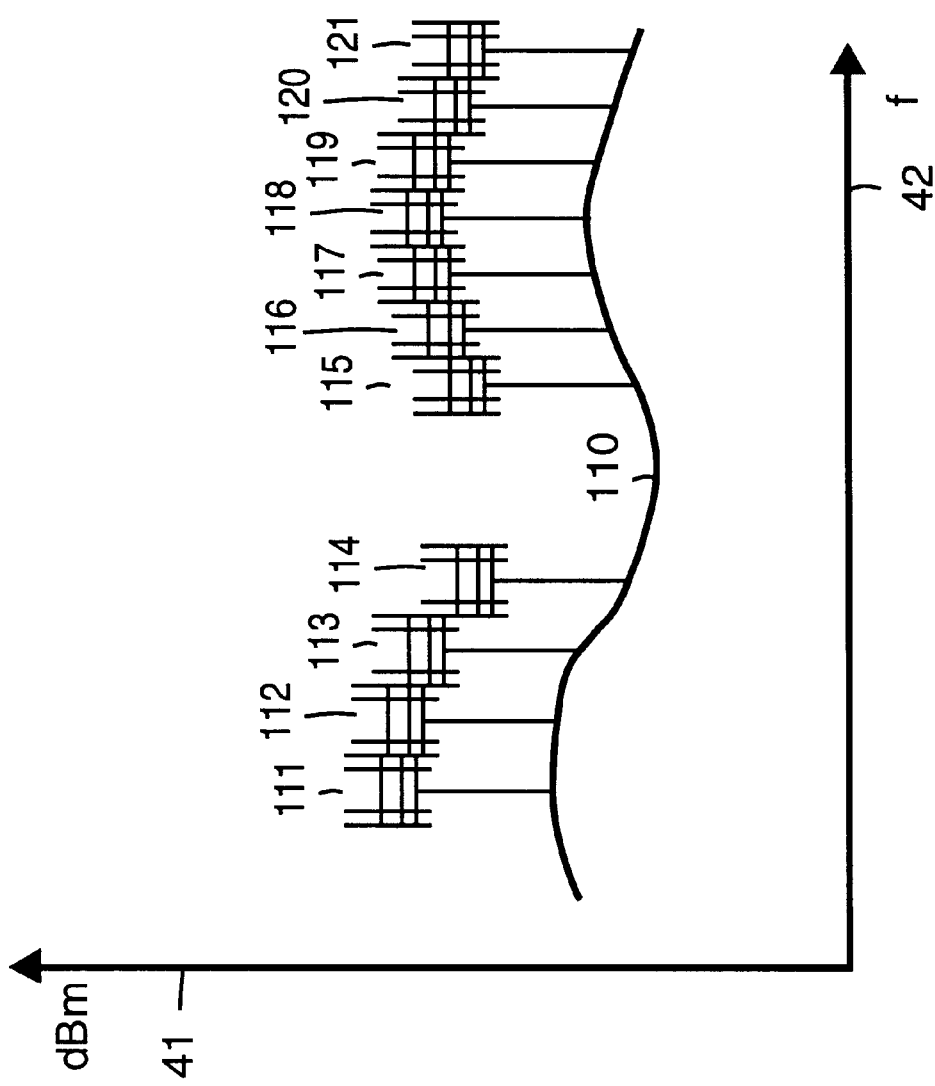
FIG. 4 shows active channel masks with non-uniform channel spacing and variable amplitude threshold limit lines in accordance with a preferred embodiment of the present invention.

It is common that the channel bandwidth and channel center frequency spacing is uniform over the operating wavelength range of a WDM system. However, some WDM system manufactures use non-uniform channel spacing. And some systems have separate bands where the spacing is dependent on the band of operation. FIG. 4 illustrates how the definition of the mask can be varied to take this into account.

In FIG. 4, a wave form 110 represents a noise floor in a WDM system. In FIG. 4, an active mask 111, an active mask 112, an active mask 113, an active mask 114 all have the same channel spacing but a different power threshold line. Likewise, an active mask 115, an active mask 116, an active mask 117, an active mask 118, active mask 119, an active mask 120 and an active mask 121 also all have the same channel spacing but a different power threshold line. Thus, the user may specify non-uniform channel spacing and variable amplitude threshold limit lines.

A typical use is where the amplitude and frequency limit line settings are identical within a specific band of operation. For example, FIG. 5 illustrates a dual band system with different data rates and signal strengths.

Figure 5:
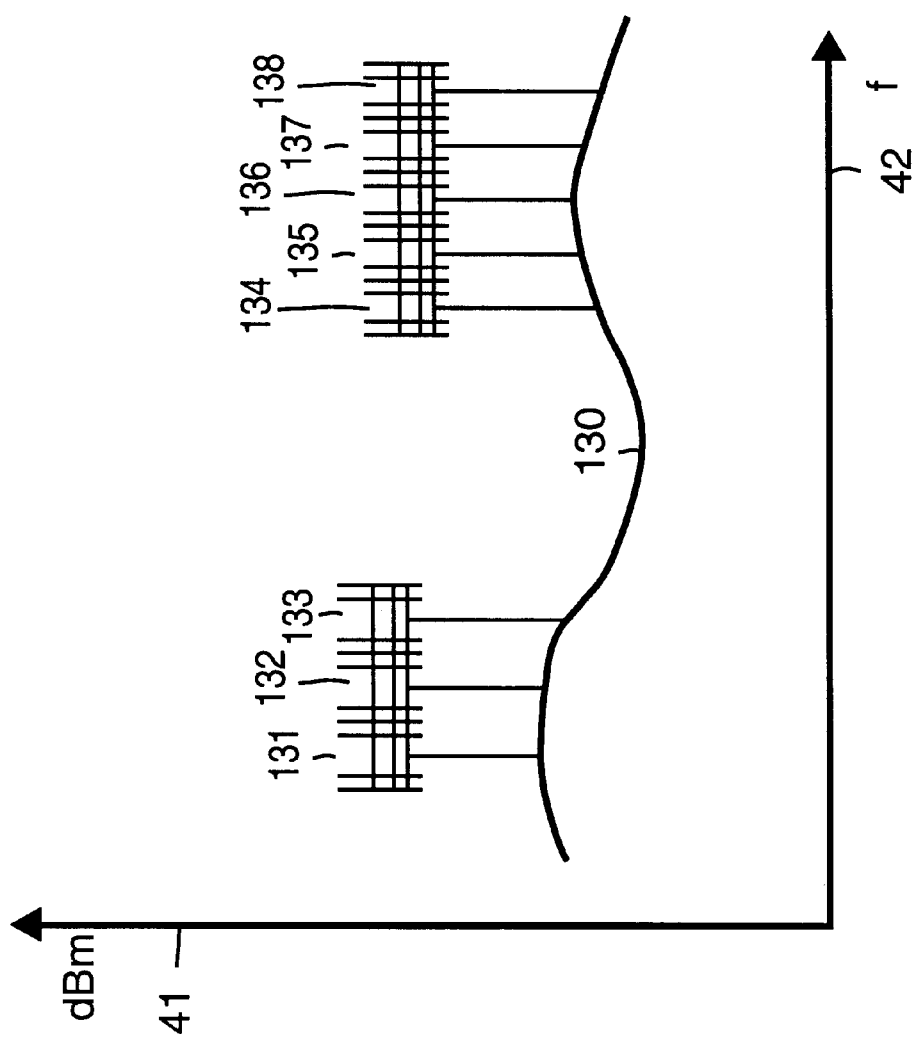
FIG. 5 shows active channel masks where amplitude threshold and frequency limit lines are identical within a specific band of operation in accordance with a preferred embodiment of the present invention.

Particularly, in FIG. 5, a waveform 130 represents a noise floor in a WDM system. An active mask 131, an active mask 132 and an active mask 133 all have the same channel spacing and the same power threshold line. Likewise, an active mask 134, an active mask 135, an active mask 136, an active mask 137 and an active mask 138 all have the same channel spacing and the same power threshold line. Thus FIG. 5 illustrates the most common use of the mask where, within one or more bands, all of the amplitude threshold levels are set to the same value. In FIG. 5 there are two WDM bands each with unique data rates and hence unique channel spacing and bandwidth.

Figure 6:
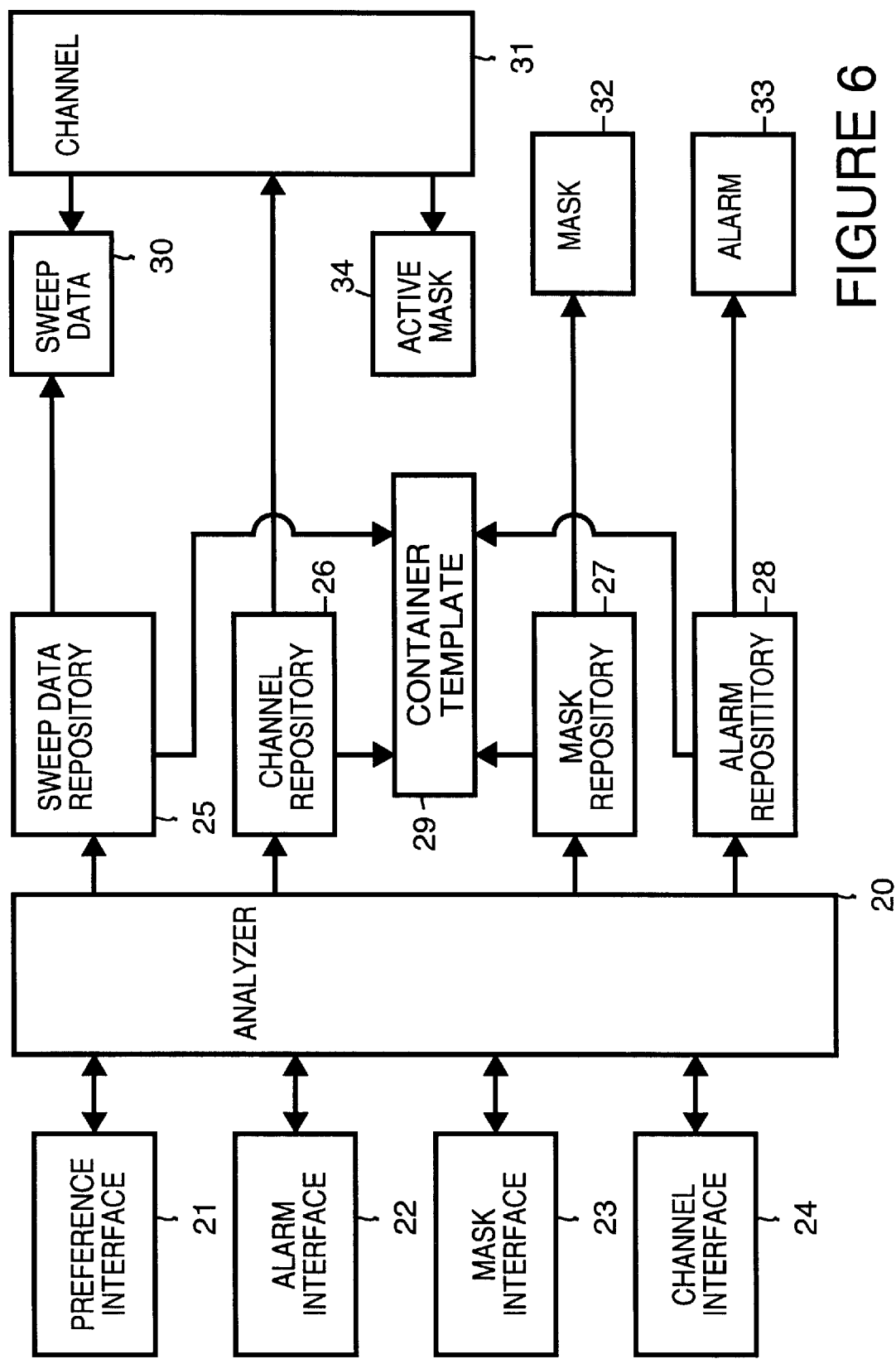
FIG. 6 is a block diagram that shows the organization of classes that implement signal analysis and the generation of channel masks in accordance with a preferred embodiment of the present invention.

FIG. 6 is a block diagram that illustrates functionality within analyzer 15. Each block in FIG. 6 represents a class used to implement a particular feature within analyzer 15.

User preferences are communicated to analyzer 15 by way of a preference interface block, an alarm interface block, a mask interface block and a channel interface block. Preference interface block 21 includes methods that provide all get and set functionality for the analyzer. Alarm interface block 22 includes methods available for the alarm container. Mask interface block 23 includes methods available for the mask container. Channel interface 24 includes methods available for the channel container. The outside calling software can get access to the analyzer data with the help of standard template library (STL) iterators supported within most C++compilers.

Analyzer block 20 includes analyze methods that take the input array as specified by methods within preferences interface block 21. Methods within the analyzer block 20 maintain or generate all channels from the input array.

Sweep data block 30 handles all data that used to update a channel. The data is mainly extracted from the input array. Sweep data repository 25 provides a container for all sweep data.

Channel block 31 is the class for channels. A channel is a signal in the input spectrum which is defined mainly by frequency and power. Each Channel has an active mask. This mask (called active mask) defines the frequency range within which the channel will be recognized. The active mask is assigned to the channel in the first sweep or in each sweep. The channel is updated using methods within channel block 31. Channel repository 26 provides a container for all channels.

Mask Repository 27 contains masks for the whole frequency range. A new mask can be added by a user (or by another software module) using mask interface block 23. After a channel has been found the active mask information is updated with the mask for the current frequency of the channel. This update can happen each sweep or only the first sweep (that leads to an active mask that moves within the channel). After the assignment of the mask to the channel, the channel is identified by the higher and lower active mask frequency boundaries.

Mask block 32 is the class for masks. Active mask block 34 is the assigned frequency range for the channel. This information will be generated from mask repository 27 because mask repository 27 holds user-defined masks for the whole frequency range.

Alarm block 33 is the class for alarms. Alarm repository 27 provides all violation information collected in time.

Container template 29 is the base class for each of the repositories. The base class for the repositories is based on STL container types. Suitable containers are list or vector. The base class contains basic methods for each repository.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for monitoring multiple signals comprising the following steps:
    (a) initializing an active mask for each monitored frequency channel, the active mask including an operating window defined by a minimum frequency, a maximum frequency, a minimum amplitude and a maximum amplitude, wherein the minimum amplitude is not the same for all monitored frequency channels and wherein the maximum amplitude is not the same for all monitored frequency channels; and,
    (b) monitoring each signal from the multiple signals to determine when the signal strays outside the operating window, including the following substep:
        (b.1) generating an alarm when the signal strays outside the operating window.

2. A method as in claim 1 wherein in step (a) the active mask for each monitored frequency channel additionally includes a center frequency, a minimum channel frequency limit, a maximum channel frequency limit and a power threshold.

3. A method as in claim 1 wherein in substep (b.1) generating the alarm includes recording the following:
    channel information;
    time of alarm generation;
    a date of the alarm generation; and,
    an error code that indicates a region of operation at the time of the alarm generation.

4. A method as in claim 1 wherein in step (a), values for the minimum amplitude channel and the maximum amplitude channel are defined for each monitored frequency channel so as to maintain a constant optical-signal-to-noise ratio among the monitored frequency channels.

5. A method as in claim 1 wherein in step (a), active masks within specified frequency bands have identical channel spacing with varying minimum amplitudes.

6. A method as in claim 1 wherein in step (a), active masks within specified frequency bands have identical channel spacing with identical minimum amplitudes.

7. An instrument that monitors multiple signals, comprising:
    an interface initializing an active mask for each monitored frequency channel, the active mask including an operating window defined by a minimum frequency, a maximum frequency, a minimum amplitude and a maximum amplitude, wherein the minimum amplitude is not the same for all monitored frequency channels and wherein the maximum amplitude is not the same for all monitored frequency channels;

a monitor monitoring each signal from the multiple signals to determine when the signal strays outside the operating window, the monitor generating an alarm when the signal strays outside the operating window.

8. An instrument as in claim 7 wherein the active mask for each monitored frequency channel additionally includes a center frequency, a minimum channel frequency limit, a maximum channel frequency limit and a power threshold limit.

9. An instrument as in claim 7 wherein in substep (b.1) generating the alarm includes recording the following:

channel information;

time of alarm generation;

date of the alarm generation; and, error code that indicates a region of operation at the time of the alarm generation.

10. An instrument as in claim 7 wherein values for the minimum amplitude channel and the maximum amplitude channel are defined for each monitored frequency channel so as to maintain a constant optical-signal-to-noise ratio among the monitored frequency channels.

11. An instrument as in claim 7 wherein active masks within specified frequency bands have identical channel spacing with varying minimum amplitudes.

12. An instrument as in claim 7 wherein active masks within specified frequency bands have identical channel spacing with identical minimum amplitudes.

13. An instrument as in claim 7 wherein the instrument is used for monitoring wavelength division multiplexing (WDM) transmission systems.

14. A monitoring scheme within an instrument that monitors multiple signals, the monitoring scheme comprising:

an interface initializing an active mask for each monitored frequency channel, the active mask including an operating window defined by a minimum frequency, a maximum frequency, a minimum amplitude and a maximum amplitude, wherein the minimum amplitude is not the same for all monitored frequency channels and wherein the maximum amplitude is not the same for all monitored frequency channels;

a monitor monitoring each signal from the multiple signals to determine when the signal strays outside the operating window, the monitor generating an alarm when the signal strays outside the operating window.

15. A monitoring scheme as in claim 14 wherein the active mask for each monitored frequency channel additionally includes a center frequency, a minimum channel frequency limit, a maximum channel frequency limit and a power threshold limit.

16. A monitoring scheme as in claim 14 wherein in substep (b.1) generating the alarm includes recording the following:

channel information;

time of alarm generation;

date of the alarm generation; and, error code that indicates a region of operation at the time of the alarm generation.

17. A monitoring scheme as in claim 14 wherein values for the minimum amplitude channel and the maximum amplitude channel are defined for each monitored frequency channel so as to maintain a constant optical-signal-to-noise ratio among the monitored frequency channels.

18. A monitoring scheme as in claim 14 wherein active masks within specified frequency bands have identical channel spacing with varying minimum amplitudes.

19. A monitoring scheme as in claim 14 wherein active masks within specified frequency bands have identical channel spacing with identical minimum amplitudes.

20. A monitoring scheme as in claim 14 wherein the instrument is used for monitoring wavelength division multiplexing (WDM) transmission systems.

* * * * *